United States Patent [19]

Cook

[11] Patent Number: 5,311,654
[45] Date of Patent: May 17, 1994

[54] TOOL HOLDER SYSTEM AND METHOD OF MAKING

[76] Inventor: Harold D. Cook, 33642 Via Martos, Dana Point, Calif. 92629

[21] Appl. No.: 951,210

[22] Filed: Sep. 25, 1992

[51] Int. Cl.⁵ .................... B23P 11/02; B21D 39/00; B23B 5/22; B23B 51/06

[52] U.S. Cl. ........................... 29/447; 29/508; 29/517; 279/103; 279/145; 408/239 A; 408/56

[58] Field of Search ............... 29/446, 447, 525, 506, 29/508, 516, 517; 76/108.6; 279/102, 103, 104, 145; 408/226, 239 R, 1 R, 238, 239 A, 56, 60

[56] References Cited

U.S. PATENT DOCUMENTS

| | | | |
|---|---|---|---|
| 1,285,589 | 11/1918 | Barnes | 76/108.6 |
| 1,404,016 | 1/1972 | Engelbrecht | 408/56 |
| 1,409,753 | 3/1922 | Moore | 76/108.6 |
| 1,539,413 | 5/1925 | Fish . | |
| 1,936,498 | 11/1933 | Corbett | 76/108 |
| 1,994,792 | 3/1935 | Sanderson | 255/63 |
| 2,125,005 | 7/1938 | Jearum | 29/96 |
| 2,161,062 | 6/1939 | Killgore | 262/33 |
| 2,374,919 | 5/1945 | Bruseth | 90/11 |
| 2,860,547 | 11/1958 | Stephan | 90/11 |
| 2,893,291 | 7/1959 | Hollis | 90/11 |
| 2,913,935 | 11/1959 | Flannery et al. | 77/58 |
| 2,918,290 | 12/1959 | Werstein | 279/19 |
| 2,920,913 | 1/1960 | Antila | 287/119 |
| 3,053,118 | 9/1962 | Lavalle | 76/108 |
| 3,221,404 | 12/1965 | Averill et al. | 279/103 X |
| 3,307,243 | 3/1967 | Andreasson | 408/60 X |
| 3,372,951 | 3/1968 | McCash | 287/91 |
| 3,397,615 | 8/1968 | Meinke | 90/11 |
| 3,424,055 | 1/1969 | Rollat | 90/11 |
| 3,557,419 | 1/1971 | Flannery | 29/105 |
| 3,734,515 | 5/1973 | Dudek | 279/1 A |
| 3,937,587 | 2/1976 | Lindem et al. | 408/181 |
| 3,945,752 | 3/1976 | Bennett | 408/146 |
| 3,989,260 | 11/1976 | Zonkov et al. | 279/4 |
| 3,994,615 | 11/1976 | Narang | 408/226 |
| 4,021,051 | 5/1977 | Toyomoto et al. | 279/1 |
| 4,099,889 | 7/1978 | Vig | 408/239 |
| 4,133,545 | 1/1979 | Kumori | 279/83 |
| 4,226,562 | 10/1980 | Schmid et al. | 409/233 |
| 4,251,113 | 2/1981 | Mitin et al. | 279/103 X |
| 4,453,775 | 6/1984 | Clemmow | 299/81 |
| 4,619,564 | 10/1986 | Jacobson | 408/146 |
| 4,629,374 | 12/1986 | Berner . | |
| 4,668,138 | 5/1986 | Carter | 409/234 |
| 4,795,292 | 1/1989 | Dye | 408/60 X |
| 4,818,161 | 4/1989 | Cook | 409/234 |
| 4,856,844 | 8/1989 | Renaver . | |
| 4,934,743 | 6/1990 | Kupgan et al. | 29/447 X |
| 4,971,491 | 11/1990 | Cook | 409/131 |
| 5,048,375 | 9/1991 | Kobayashi | 279/103 X |

FOREIGN PATENT DOCUMENTS

| | | | |
|---|---|---|---|
| 26751 | 11/1981 | European Pat. Off. | 279/1 TS |
| 2229374 | 1/1974 | Fed. Rep. of Germany | 279/1 A |
| 2759007 | 8/1978 | Fed. Rep. of Germany | 408/239 A |
| 16976 | 2/1978 | Japan | 279/1 A |
| 551065 | 2/1942 | United Kingdom | 408/146 |
| 729295 | 5/1955 | United Kingdom | 279/8 |
| 1319200 | 6/1973 | United Kingdom | 408/146 |
| 2137124A | 10/1984 | United Kingdom | 279/7 |

*Primary Examiner*—Timothy V. Eley
*Attorney, Agent, or Firm*—Stetina and Brunda

[57] ABSTRACT

A tool holder for use in a machine tool spindle comprising a shank portion, a tool mounting portion and a circular flange portion. Disposed in the distal end of the mounting portion is a central aperture while disposed in the distal end of the shank portion is a threaded aperture which communicates with the central aperture. The tool holder further comprises a cylindrical sleeve member which is slidably receivable into the central aperture when a heat source is applied to the mounting portion and rigidly maintained within the central aperture via thermal contraction when the mounting portion is cooled. A tool mounting aperture extends axially through the sleeve member which is in fluid communication with the threaded aperture. The shank portion of a cutting tool is slidably receivable into the mounting aperture when a heat source is applied to the sleeve member and rigidly maintained within the mounting aperture via thermal contraction when the sleeve member is cooled. Disposed in and extending axially along the inner surface of the mounting aperture is at least one channel for forming a coolant fluid passage between the tool holder and the cutting tool.

15 Claims, 2 Drawing Sheets

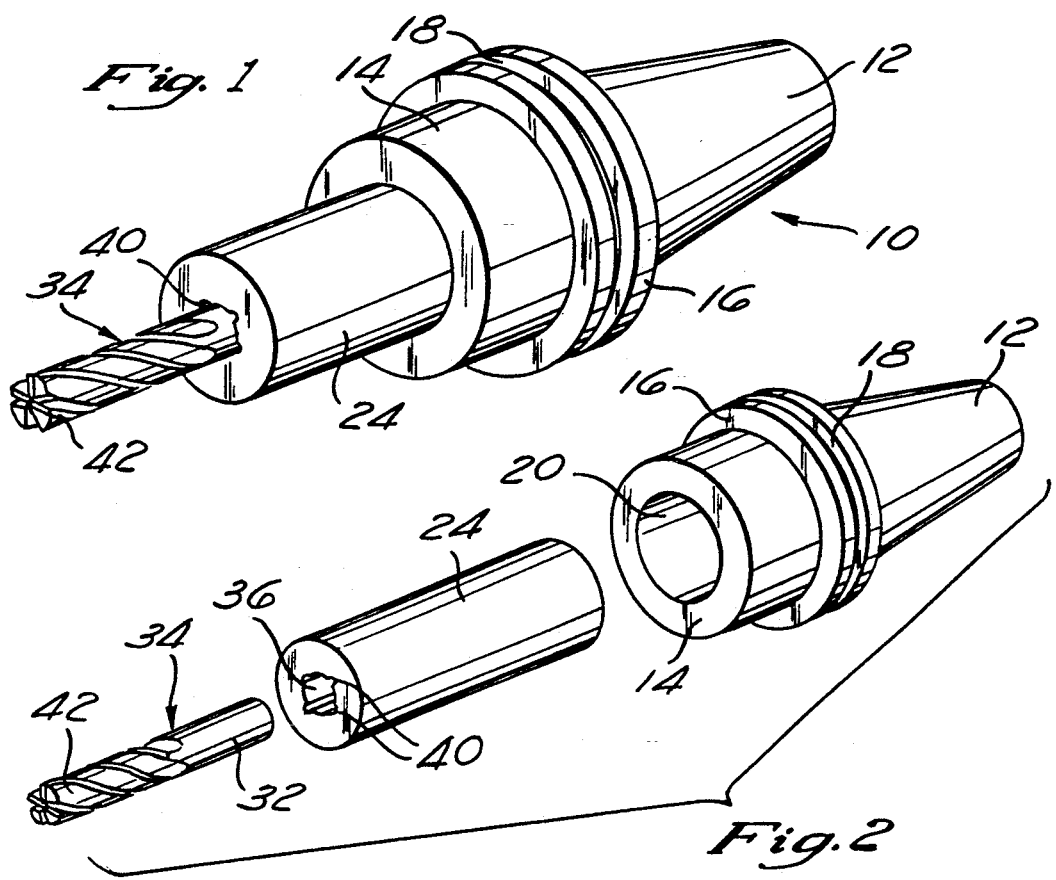
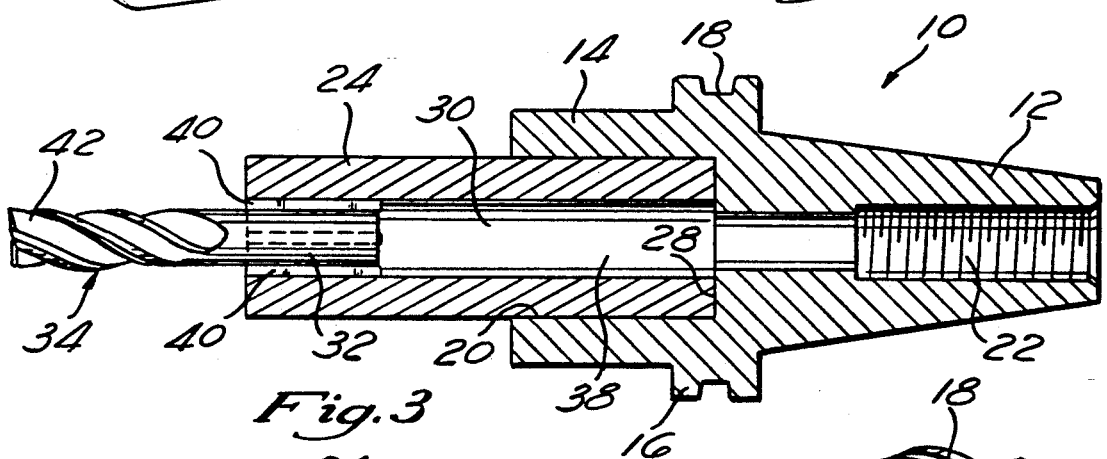
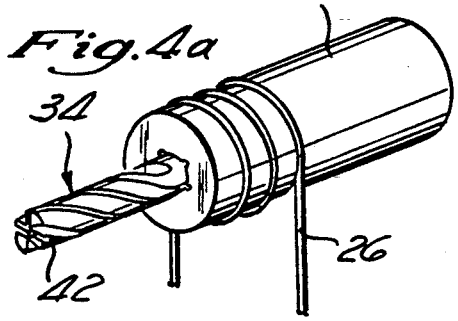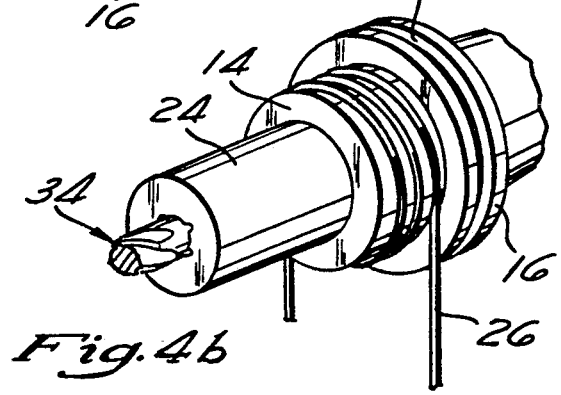

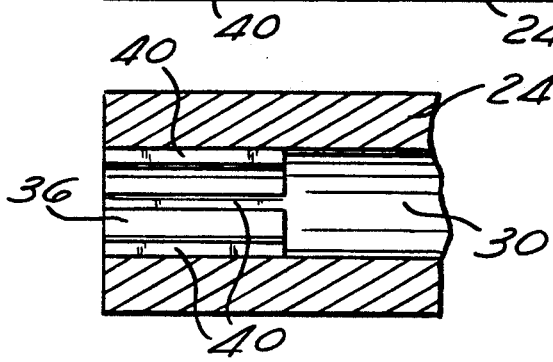
Fig. 5b
Fig. 5a
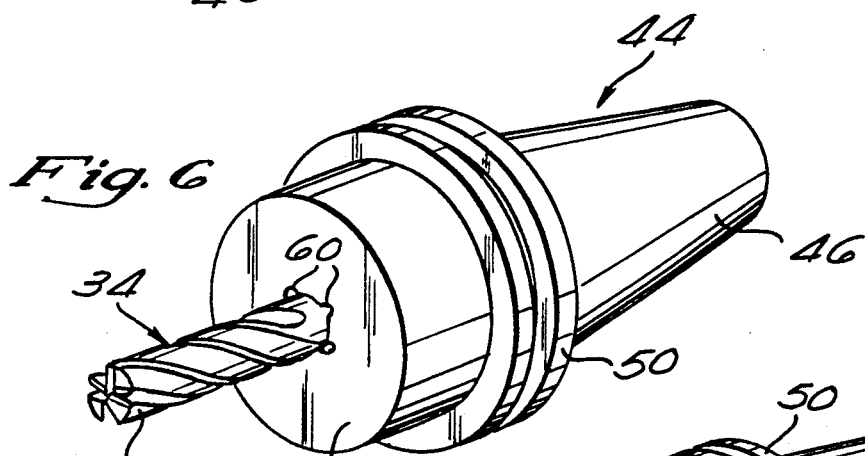
Fig. 6
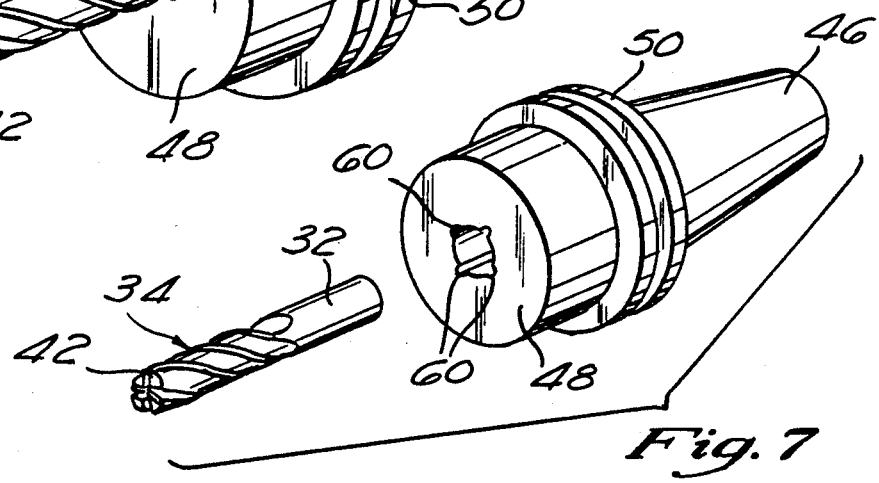
Fig. 7
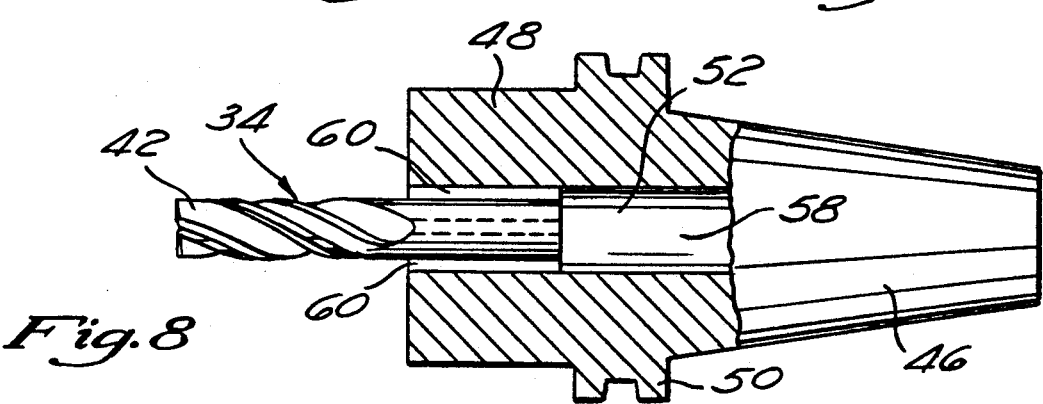
Fig. 8

TOOL HOLDER SYSTEM AND METHOD OF MAKING

FIELD OF THE INVENTION

The present invention relates generally to machine tools, and more particularly, to an improved tool holder system and method of utilizing the same.

BACKGROUND OF THE INVENTION

As is well known, various tool holders have been utilized in the prior art which interface with a rotating spindle of a machine tool such as a milling or boring machine to securely hold a cutting tool upon the machine during cutting of a work piece. Though the prior art tool holders are suitable for interfacing a cutting tool to the rotating spindle of the machine tool, these holders possess certain deficiencies which detract from their overall utility.

In most prior art tool holders, a central aperture is formed therein for receiving the shank portion of the cutting tool which is to be interfaced to the milling machine. Typically, the central aperture is formed approximately one to two ten-thousandths of an inch greater in diameter than the shank portion of the cutting tool to allow the shank portion to be easily and quickly inserted thereinto. Thereafter, a set screw extending perpendicular to the cutting tool within the tool holder is tightened upon the cutting tool and the tool holder is drawn or pulled tightly into the spindle so as to rigidly maintain the cutting tool therewithin. However, the formation of the central aperture with a greater diameter than the shank portion of the cutting tool to enable manual reciprocation of the cutting tool within the tool holder has been known to make the tool holder susceptible to non-concentric mounting of the cutting tool therein which in modern, high tolerance machining applications has proved unacceptable. In this regard, in high-speed cutting applications, such as those performed on a vertical milling machine, minor variations in the concentricity of the cutting tool within the tool holder oftentimes causes catastrophic failure in the cutting operation.

A further deficiency associated with many prior art tool holders is the inability of the tool holder to feed coolant fluid onto the cutting portion of the cutting tool during a machining operation. During machining operations, such as those performed on vertical milling machines, coolant fluid is typically applied to the surfaces of the work piece and the cutting portion of the cutting tool to reduce tool wear and to enhance the out by reducing the temperature of the cutting tool and work piece. Additionally, the coolant fluid is used to wash away chips which build up on the work piece during the cutting operation. Since most prior art tool holders are not adapted to allow the passage of coolant fluid therethrough to the surfaces of the cutting tool and work piece, the coolant fluid must generally be applied to the work piece and cutting tool manually or via a separate spray head which is disposed directly adjacent the cutting portion of the cutting tool and work piece.

In recognition of this deficiency, a number of prior art tool holders have been developed which channel coolant fluid through the spindle and onto the cutting tool and work piece. One such tool holder is manufactured by the X-L Tool Company of Moreno Valley, Calif. under the name "Flush Cut." In this particular device, a plurality of angularly oriented fluid passages are disposed in the tool mounting portion of the tool holder so as to spray coolant fluid onto the cutting tool mounted therein. However, the process of forming the angled passages within the tool holder is both expensive and time-consuming. Additionally, the tool holder is not adapted to eliminate eccentricity in the cutting tool when such is mounted therein. Another prior art device which is adapted to apply coolant fluid to the tip of a cutting insert is disclosed in U.S. Pat. No. 4,453,775 to CLEMMOW. However, in the cutting tool disclosed in the CLEMMOW reference, the cutting insert must be provided with a plurality of cross-grooves to allow the coolant fluid to flow over the tip of the cutting insert. Additionally, as with the previously described "FLUSH CUT" tool holder, the cutting tool disclosed in the CLEMMOW reference is not adapted to eliminate eccentricity of the cutting insert relative the tool holder.

The present invention addresses the deficiencies associated with prior art tool holders by providing a tool holder system which is adapted to direct coolant fluid over the cutting tool and is particularly suited to eliminate eccentricity in the mounting of the cutting tool within the tool holder. As such, the present system is specifically adapted to facilitate the rigid and true mounting of a cutting tool within a tool holder for use in high-speed cutting applications.

SUMMARY OF THE INVENTION

In accordance with a first embodiment of the present invention, there is provided a tool holder for use in a machine tool spindle. The tool holder generally comprises a conically tapered shank portion for mounting in the tool spindle and a generally cylindrical tool mounting portion. Disposed between the proximal ends of the shank and tool mounting portions is a circular flange portion which includes a circumferentially extending recess disposed therein. Disposed in the distal end of the mounting portion is a central aperture which extends axially toward the distal end of the shank portion to a depth approximately commensurate with the location of the flange portion. Additionally, disposed in the distal end of the shank portion is a threaded aperture which extends axially toward the flange portion to a depth whereat the threaded aperture communicates with the central aperture.

The tool holder further comprises a cylindrical sleeve member which has an outer diameter slightly exceeding the diameter of the central aperture and is slidably receivable into the central aperture to a desired axial position when a heat source is applied to the mounting portion. The sleeve member is rigidly maintained within the central aperture via thermal contraction when the mounting portion is cooled. Extending axially through the sleeve member is a tool mounting aperture which is in fluid communication with the threaded aperture when the sleeve member is mounted within the central aperture. The mounting aperture is formed having a diameter slightly less than the diameter of the shank portion of a cutting tool to be mounted into the tool holder. The tool shank is slidably receivable into the mounting aperture when a heat source is applied to the sleeve member and rigidly maintained within the mounting aperture via thermal contraction when the sleeve member is cooled.

Disposed in and extending axially along the inner surface of the mounting aperture is at least one channel for forming a coolant fluid passage between the tool holder and the cutting end of the cutting tool when the tool shank is mounted within the mounting aperture. In the first embodiment, four channels are formed along the inner surface of the mounting aperture which are circumferentially spaced at approximately ninety degree intervals. The mounting aperture is preferably formed so as to define a distal portion having a diameter slightly less than the diameter of the tool shank and a proximal portion having a diameter exceeding the diameter of the tool shank. When the mounting aperture is formed in this manner, the four channels are formed only in the inner surface of the distal portion thereof.

In a second embodiment of the present invention, the sleeve member is eliminated with the mounting aperture being disposed directly within the distal end of the mounting portion and extending axially toward the distal end of the shank portion to a depth approximately commensurate with the location of the flange portion. The mounting aperture communicates with the threaded aperture and is preferably formed to include a reduced diameter distal portion. The mounting aperture also includes at least one and preferably four channels disposed in and extending axially along the inner surface of the distal portion thereof for forming coolant fluid passages to the cutting end of the cutting tool when the tool shank is mounted in the mounting aperture.

In both the first and second embodiments of the present invention, heat is applied to the mounting portion and sleeve member preferably via an induction heater. In the first embodiment, the central aperture is formed having a diameter between 0.0005 and 0.003 of an inch less than the diameter of the sleeve member, while in both the first and second embodiments, the mounting aperture is formed having a diameter between 0.0005 and 0.003 of an inch less than the diameter of the tool shank of the cutting tool. Advantageously, the thermal contraction of the central aperture about the sleeve member in the first embodiment and the thermal contraction of the mounting aperture about the tool shank in the first and second embodiments is operable to mount the cutting tool within the tool holder in a desired axial position and maintain the concentricity of the cutting tool throughout the rotary motion of the rotating spindle of the milling machine. Additionally, the inclusion of the axially extending channels within the mounting aperture facilitates the passage of coolant fluid between the periphery of the tool shank of the cutting tool and the tool holder, thus allowing the coolant fluid to be passed to the cutting end of the cutting tool without the necessity of having to make modifications to the cutting tool itself.

BRIEF DESCRIPTION OF THE DRAWINGS

These as well as other features of the present invention will become more apparent upon reference to the drawings wherein:

FIG. 1 is a perspective view of a tool holder system constructed in accordance with a first embodiment of the present invention;

FIG. 2 is an exploded view of the tool holder system shown in FIG. 1;

FIG. 3 is a cross-sectional view of the tool holder system shown in FIG. 1;

FIG. 4a is a perspective view illustrating the heating of the sleeve member of the tool holder via an induction heater;

FIG. 4b is a perspective view illustrating the heating of the mounting portion of the tool holder via an induction heater;

FIG. 5a is a cross-sectional view of an alternative embodiment of the sleeve member used in the tool holder system shown in FIG. 1;

FIG. 5b is a cross-sectional review of the distal portion of the sleeve member shown in FIG. 3;

FIG. 6 is a perspective view of a tool holder system constructed in accordance with a second embodiment of the present invention;

FIG. 7 is an exploded view of the tool holder system shown in FIG. 6; and

FIG. 8 is a cross-sectional view of the tool holder system shown in FIG. 6.

DETAILED DESCRIPTION OF THE PREFERRED EMBODIMENT

Referring now to the drawings wherein the showings are for purposes of illustrating preferred embodiments of the present invention only, and not for purposes of limiting the same, FIG. 1 perspectively illustrates a tool holder system 10 constructed in accordance with a first embodiment of the present invention. The tool holder 10 includes a conically tapered shank portion 12, a generally cylindrical cutting tool mounting portion 14 and a generally circular flange portion 16 disposed between the shank portion 12 and mounting portion 14. The flange portion 16 includes a circumferentially extending V-shaped recess 18 which serves as a means for allowing an automated tool holder changer (not shown) to carry and contact the tool holder 10 for automatic removal and insertion of the tool holder 10 from the spindle of a machine tool such as a milling machine.

The cutting tool mounting portion 14 of the tool holder 10 includes a central aperture 20 which extends from the distal end of the mounting portion 14 axially toward the opposite end of the tool holder 10 to a depth approximately commensurate with the location of the flange portion 16. The distal end of the shank portion 12 of the tool holder 10 is provided with a partially threaded shank aperture 22 which extends axially toward the flange portion 16 to a depth whereat the shank aperture 22 communicates with the central aperture 20, as seen in FIG. 3. Those skilled in the art will recognize that the particular tool holder 10 depicted and described above is substantially similar for all of the standard tool holder dimensional configurations such as the American Standard, Japanese B. T., European B. N. and Caterpillar V - Flange Standard with the major difference being in the axial lengths of the shank portion 12 and flange portion 16.

The tool holder 10 further comprises a cylindrical sleeve member 24 having an outer diameter slightly exceeding the diameter of the central aperture 20. Particularly, the outer diameter of the sleeve member is sized to be approximately one to three ten-thousandths of an inch greater than the diameter of the central aperture 20. In the first embodiment, the sleeve member 24 is slidably receivable into the central aperture 20 when a heat source, such as an induction heater 26, is applied to the mounting portion 14 in the manner shown in FIG. 4b. In this respect, the application of heat to the mounting portion 14 preferably via the induction heater 26 causes thermal expansion whereby the effective diameter of the central aperture 20 is increased thereby allowing the sleeve member 24 to be slidably inserted thereinto. When the central aperture 20 is thermally expanded, the sleeve member 24 is inserted thereinto to a desired axial position. Typically, the sleeve member 24 will be fully inserted into the expanded central aperture 20 until such time as the proximal end of the sleeve member 24 is abutted against a shoulder 28 defined within the tool holder 10 at the location where the central aperture 20 communicates with the shank aperture 22. Upon removal of the externally applied heat to the mounting portion 14, thermal contraction causes the effective diameter of the central aperture 20 to decrease, thus causing a metal-to-metal press fit to exist between the proximal portion of the sleeve member 24 and the mounting portion 14.

Extending axially through the sleeve member 24 is a tool mounting aperture 30. As seen in FIG. 3, when the sleeve member 24 is fully received into the central aperture 20, i.e. abutted against the shoulder 28, the mounting aperture 30 is in fluid communication with the shank aperture 22. In the first embodiment, the mounting aperture 30 is formed having a diameter slightly less than the diameter of the cylindrical tool shank 32 of a cutting tool 34 to be mounted into the tool holder 10. Particularly, the diameter of the mounting aperture 30 is typically sized to be approximately three ten-thousandths to one-thousandth of an inch less than the diameter of the tool shank 32 of the cutting tool 34. As seen in FIG. 4, the tool shank 32 is slidably receivable into the mounting aperture 30 when a heat source such as the induction heater 26 is applied to the sleeve member 24 which causes the effective diameter of the mounting aperture 30 to increase in an amount sufficient to allow the tool shank 32 to be slidably inserted thereinto to a desired axial position. When the external application of heat via the induction heater 26 is discontinued and the sleeve member 24 allowed to cool back to ambient temperature, thermal contraction causes the mounting aperture 30 to form a rigid interface, i.e. a metal-to-metal press fit, between the sleeve member 24 and tool shank 32 of the cutting tool 34. As such, the cutting tool 34 is rigidly maintained within the sleeve member 24 in a concentric fashion for high tolerance machining applications.

As best seen in FIGS. 3 and 5a, the mounting aperture 30 is preferably formed in a manner defining a distal portion 36 having a diameter slightly less than the diameter of the tool shank 32 of the cutting tool 34, and a proximal portion 38 having a diameter exceeding the diameter of the tool shank 32. In this respect, the reduced diameter distal portion 36 extends along approximately one-quarter of the length of the mounting aperture 30. Disposed in and extending axially along the inner surface of the reduced diameter distal portion 36 are four elongate channels 40 which are circumferentially spaced at approximately 90 degree intervals. Alternatively as seen in FIG. 5b, the mounting aperture 30 may be formed within the sleeve member 24 so as to be of a uniform diameter throughout, wherein the diameter is slightly less than the diameter of the tool shank 32 of the cutting tool 34. When the mounting aperture 30 is formed in this manner, the channels 40 extend axially along the entire length of the inner surface thereof.

In the first embodiment, the tool holder 10 is adapted to allow a coolant fluid to pass therethrough. The coolant fluid is introduced into the tool holder 10 via the shank aperture 22, and passes from the shank aperture 22 into the proximal end of the mounting aperture 30 of the sleeve member 24 mounted within the central aperture 20. Due to the inclusion of the channels 40 in the inner surface of the distal portion 36 of the mounting aperture 30, the coolant fluid is able to flow around the periphery of the tool shank 32 of the cutting tool 34 mounted within the sleeve member 24. The coolant fluid flows through the channels 40 and onto the cutting end 42 of the cutting tool 34. To facilitate the passage of the coolant fluid over the cutting end 42, the tool shank 34 is preferably disposed in the mounting aperture 30 in a manner wherein each of the four channels 40 are aligned with a respective flute of the cutting end 42. Though the mounting aperture 30 preferably includes four channels 40 disposed in the inner surface thereof, it will be recognized that greater or lesser numbers of the channels may be incorporated therein.

In the first embodiment of the present invention, the sleeve member 24 and the remainder of the tool holder 10 may be fabricated from dissimilar materials. In this regard, all that is necessary is that the materials used to fabricate the tool holder 10 possess the necessary thermal expansion and contraction characteristics to allow the central aperture 20 and the mounting aperture 30 to be thermally enlarged in the aforementioned manner.

To mount the cutting tool 34 into the tool holder 10, the sleeve member 24 is externally heated via the induction heater 26. Due to the thermal expansion characteristics of the sleeve member 24, the application of the external heat energy thereto causes the mounting aperture 30 therewithin to enlarge in an amount sufficient to allow the tool shank 32 of the cutting tool 34 to be slidably inserted thereinto. After the tool shank 32 has been inserted into the mounting aperture 30 in a desired axial position, the external application of heat is discontinued and the sleeve member 24 allowed to cool back to ambient temperature wherein thermal contraction causes the mounting aperture 30 to form a rigid interface, i.e. a metal-to-metal interference fit, between the sleeve member 24 and the tool shank 32.

After the cutting tool 34 has been mounted within the sleeve member 24, the mounting portion 14 of the tool holder 10 is externally heated by the induction heater 26, thus causing the central aperture 20 to enlarge in an amount sufficient to allow the proximal end of the sleeve member 24 to be slidably inserted thereinto. After the sleeve member has been mounted in the central aperture 20 in a desired axial position, the external application of heat via the induction heater 26 is discontinued and the mounting portion 14 of the tool holder 10 allowed to cool. As the mounting portion 14 cools back to ambient temperature, thermal contraction causes the central aperture 20 to form a rigid interface, i.e. a metal-to-metal press fit, between the sleeve member 24 and the mounting portion 14. Advantageously, the thermal contraction of the central aperture 20 about the sleeve member 24 and the mounting aperture 30 about the tool shank 32 of the cutting tool 34 is operable to maintain the concentricity of the cutting tool 34 throughout the rotary motion of the rotating spindle of the milling machine during high tolerance machining applications.

Referring now to FIGS. 6-8, illustrated is a tool holder 44 constructed in accordance with a second embodiment of the present invention. In the second embodiment, tool holder 44 is configured similarly to the tool holder 10 previously described and includes a conically tapered shank portion 46, a generally cylindrical cutting tool mounting portion 48 and a circular flange portion 50 disposed between the proximal ends of the shank portion 46 and mounting portion 48.

As an alternative to the central aperture 20 previously described, the tool holder 44 of the second embodiment includes a mounting aperture 52 disposed in the distal end of the mounting portion 48 and extending axially toward the distal end of the shank portion 46 to a depth approximately commensurate with the location of the flange portion 50. Disposed in the distal end of the shank portion 46 is a partially threaded aperture which extends axially toward the flange portion 50 to a depth whereat the partially threaded aperture communicates with the mounting aperture 52.

Similar to the mounting aperture 30, the mounting aperture 52 of the second embodiment is formed in a manner defining a distal portion 56 having a diameter slightly less than the diameter of the tool shank 32 of the cutting tool 34 and a proximal portion 58 having a diameter exceeding the diameter of the tool shank 32. Disposed in and extending axially along the inner surface of the distal portion 56 of the mounting aperture 52 are four channels 60 which are circumferentially spaced at approximately 90 degree intervals. However, the number of channels 60 formed in the mounting aperture 52 may be increased or decreased. Additionally, the mounting aperture 52 may be formed having a uniform diameter throughout the length thereof, with the channels 60 extending along the entire length of the inner surface of the mounting aperture 52.

In the second embodiment, the cutting tool 34 is mounted into the tool holder 44 by externally heating the mounting portion 48 via an induction heater. Due to the thermal expansion characteristics of the tool holder 44, the application of the external heat energy to the mounting portion 48 causes the mounting aperture 52 to enlarge in an amount sufficient to allow the tool shank 32 to be slidably inserted thereinto. After the tool shank 32 is inserted into the mounting aperture 50 to a desired axial position, the external application of heat is discontinued and the tool holder 44 allowed to cool back to ambient temperature wherein thermal contraction causes the mounting aperture 52 to form a rigid interface, i.e. a metal-to-metal interference fit, between the tool holder 44 and the cutting tool 34. As such, the cutting tool 34 is rigidly maintained within the tool holder 44 in a concentric fashion for high tolerance machining applications.

When the cutting tool 34 is mounted in the tool holder 44 via the thermal contraction of the mounting aperture 52 about the tool shank 32, coolant fluid introduced into the tool holder 44 via the partially threaded aperture in the shank portion 46 flows into and through the proximal portion 58 of the mounting aperture 52 and around the periphery of the tool shank 32 via the channels 60. After flowing through the channels 60, the coolant fluid flows through the cutting tool flutes and over the cutting end 42 of the cutting tool 34. As such, the tool holder 44, like the tool holder 10, allows fluid to be easily applied to the cutting end 42 of the cutting tool 32 and to the surface of the work piece while maintaining the concentricity of the cutting tool 32 throughout the rotary motion of the rotating spindle of the milling machine.

Additional modifications and improvements of the present invention may also be apparent to those skilled in the art. Thus, the particular combination of parts described and illustrated herein is intended to represent only certain embodiments of the invention, and is not intended to serve as limitations of alternative devices within the spirit and scope of the invention.

What is claimed is:

1. A method of mounting a cutting tool having a cylindrical tool shank and a cutting end into a tool holder having a conically tapered end for mounting and use in the rotating spindle of a milling machine, comprising the steps of:

forming a central aperture of generally uniform diameter in said tool holder, said central aperture having a diameter slightly less than the outer diameter of a cylindrical sleeve member to be mounted within the central aperture;

forming a mounting aperture in said sleeve member, said mounting aperture having a diameter slightly less than the diameter of the tool shank;

forming at least one elongate channel longitudinally along the inner surface of said mounting aperture, said channel defining a coolant fluid passage between the tool shank and said sleeve member when the tool shank is mounted within the mounting aperture and the sleeve member is mounted within the central aperture for allowing coolant fluid introduced into the conically tapered end of the tool holder to be directed onto the cutting end of the cutting tool;

heating said sleeve member to a temperature sufficient to thermally increase the diameter of said mounting aperture to a size sufficient to slidably receive the tool shank;

inserting said tool shank into the mounting aperture to a desired axial position;

cooling said sleeve member to cause a thermal construction of said mounting aperture about the tool shank to mount said cutting tool within said sleeve member in said desired axial position;

heating said mounting portion to a temperature sufficient to thermally increase the diameter of said central aperture to a size sufficient to slidably receive said sleeve member;

inserting said sleeve member into said central aperture to a desired axial position; and cooling said mounting portion to cause a thermal contraction of said central aperture about said sleeve member to mount said sleeve member within said central aperture in said desired axial position;

wherein the thermal contraction of the central aperture about the sleeve member and the mounting aperture about the tool shank is adapted to maintain the concentricity of the cutting tool throughout the rotary motion of the rotating spindle of the milling machine.

2. The method of claim 1 further comprising the step of forming the mounting aperture to have a distal portion having a diameter slightly less than the diameter of the tool shank and a proximal portion having a diameter exceeding the diameter of the tool shank, said at least one channel being formed only in the inner surface of the distal portion of the mounting aperture.

3. The method of claim 1 wherein the heating steps comprise applying an induction heater to said mounting portion and said sleeve member.

4. A method for mounting a cutting tool having a cylindrical tool shank and a cutting end into a tool holder having a conically tapered end for mounting and use in the rotating spindle of a milling machine, comprising the steps of:

forming a mounting aperture of generally uniform diameter in said tool holder, said mounting aperture having a diameter slightly less then the diameter of the tool shank of the cutting tool;

forming at least one elongate channel longitudinally along the inner surface of said mounting aperture, said channel defining a coolant fluid passage between the tool shank and the cutting tool when the tool shank is mounted within the mounting aperture for allowing coolant fluid introduced into the conically tapered end of the tool holder to be directed onto the cutting end of said cutting tool;

heating said tool holder to a temperature sufficient to thermally increase the diameter of said mounting aperture to a size sufficient to slidably receive said tool shank;

inserting said tool shank into said mounting aperture to a desired axial position; and cooling said tool holder to cause a thermal contraction of said mounting aperture about said tool shank to mount said cutting tool within said tool holder in said desired axial position;

wherein the thermal contraction of said mounting aperture about the tool shank is adapted to maintain the concentricity of the cutting tool throughout the rotary motion of the rotating spindle of the milling machine.

5. The method of claim 5 further comprising the step of forming the mounting aperture to have a distal portion having a diameter slightly less than the diameter of the tool shank and a proximal portion having a diameter exceeding the diameter of the tool shank, said at least one channel being formed only in the inner surface of the distal portion of the mounting aperture.

6. The method of claim 5 wherein said heating step comprises applying an induction heater to said mounting portion.

7. A tool holder for mounting a cutting tool having a cylindrical shank and a cutting end into a rotatable machine tool spindle, comprising:

a conically tapered shank portion for mounting in the tool spindle, said shank portion having proximal and distal ends;

a generally cylindrical tool mounting portion having proximal and distal ends;

a circular flange portion disposed between the proximal ends of said shank and mounting portions;

a central aperture having a generally uniform diameter disposed in the distal end of the mounting portion and extending axially toward the distal end of the shank portion to a depth approximately commensurate with the location of the flange portion;

a partially threaded shank aperture disposed in the distal end of said shank portion and extending axially toward said flange portion to a depth whereat said shank aperture communicates with said central aperture;

a cylindrical sleeve member having an outer diameter slightly exceeding the diameter of said central aperture, said sleeve member being slidably receivable into said central aperture when a heat source is applied to said mounting portion and rigidly maintained within the central aperture via thermal contraction when said mounting portion is cooled;

a tool mounting aperture extending axially through said sleeve member, said mounting aperture being in fluid communication with said shank aperture when said sleeve member is mounted within said central aperture and having a diameter slightly less than the diameter of the shank of the cutting tool, said tool shank being slidably receivable into said mounting aperture when a heat source is applied to said sleeve member and rigidly maintained within said mounting aperture via thermal contraction when said sleeve member is cooled; and at least one elongate channel disposed in and extending longitudinally along the inner surface of said mounting aperture, said channel defining a coolant fluid passage between said tool shank and said sleeve member when the tool shank is mounted within the mounting aperture for allowing coolant fluid introduced into the shank aperture to be directed onto the cutting end of said cutting tool;

wherein the thermal contraction of the central aperture about the sleeve member and the mounting aperture about the tool shank is adapted to mount the cutting tool within the tool holder in a desired axial position and maintain the concentricity of the cutting tool throughout the rotary motion of the rotating spindle of the machine tool.

8. The device of claim 7 wherein said at least one channel comprises four channels circumferentially spaced at approximately 90 degree intervals.

9. The device of claim 7 wherein said mounting aperture defines a distal portion having a diameter slightly less than the diameter of said tool shank and a proximal portion having a diameter exceeding the diameter of said tool shank, said at least one channel being formed only in the inner surface of the distal portion of the mounting aperture.

10. The device of claim 7 wherein said central aperture is formed having a diameter between 0.0003 and 0.001 of an inch less than the outer diameter of said sleeve member.

11. The device of claim 10 wherein said mounting aperture is formed having a diameter between 0.0003 and 0.001 of an inch less than the diameter of the tool shank.

12. A tool holder for mounting a cutting tool having a cylindrical shank and a cutting end into a rotatable machine tool spindle, comprising:

a conically tapered shank portion for mounting in the tool spindle, said shank portion having proximal and distal ends;

a generally cylindrical tool mounting portion having proximal and distal ends;

a circular flange portion disposed between the proximal ends of said shank and mounting portions;

a mounting aperture having a generally uniform diameter disposed in the distal end of the mounting portion and extending axially toward the distal end of the shank portion to a depth approximately commensurate with the location of the flange portion, said mounting aperture having a diameter slightly less than the diameter of the shank of the cutting tool, said tool shank being slidably receivable into said mounting aperture when a seat source is applied to the mounting portion and rigidly maintained within said mounting aperture via thermal contraction when said mounting portion is cooled;

a partially threaded shank aperture disposed in the distal end of said shank portion and extending axially toward said flange portion to a depth whereat said shank aperture communicates with said mounting aperture; and at least one elongate channel disposed in and extending longitudinally along the inner surface of said mounting aperture, said channel defining a coolant fluid passage between said tool shank and said mounting portion when the tool shank is mounted within the mounting aperture for allowing coolant fluid introduced into the shank aperture to be directed onto the cutting end of said cutting tool.
wherein the thermal contraction of the mounting aperture about the tool shank is adapted to mount the cutting tool within the tool holder in a desired axial position and maintain the concentricity of the cutting tool throughout the rotary motion of the rotating spindle of the machine tool.

13. The device of claim 12 wherein said at least one channel comprises four channels circumferentially spaced at approximately 90 degree intervals.

14. The device of claim 12 wherein said mounting aperture defines a distal portion having a diameter slightly less than the diameter of said tool shank and a proximal portion having a diameter exceeding the diameter of said tool shank, said at least one channel being formed only in the inner surface of the distal portion of the mounting aperture.

15. The device of claim 12 wherein said mounting aperture is formed having a diameter between 0.0003 and 0.001 of an inch less than the diameter of the tool shank.

* * * * *